(No Model.) 2 Sheets—Sheet 1.
R. M. PANCOAST.
ICE SCRAPER OR SHAVER.
No. 587,230. Patented July 27, 1897.
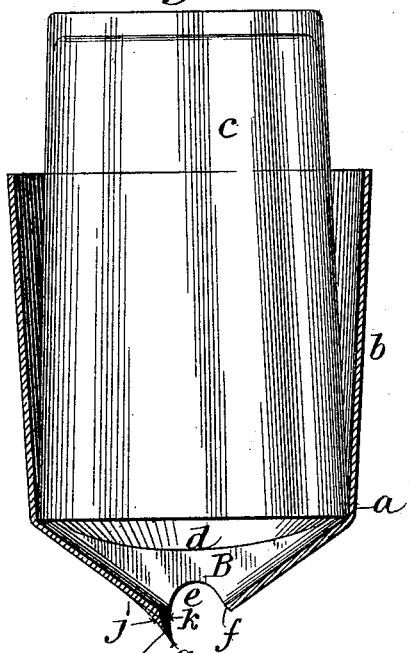
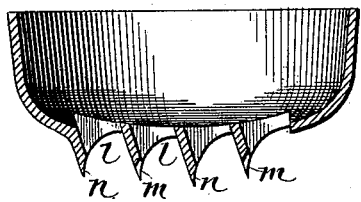
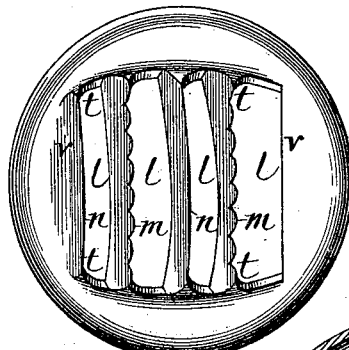
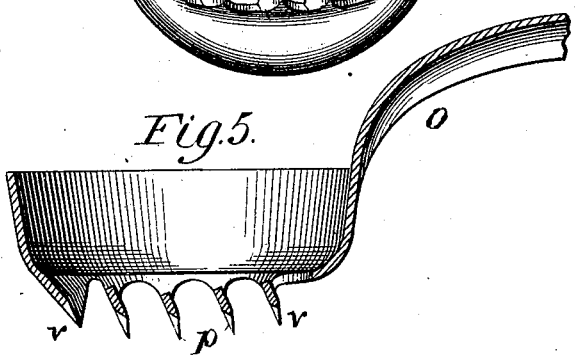
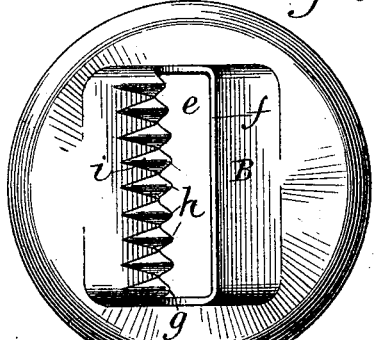
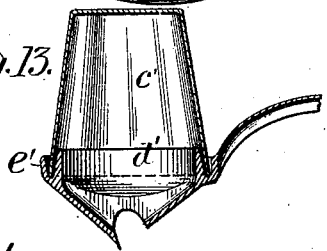
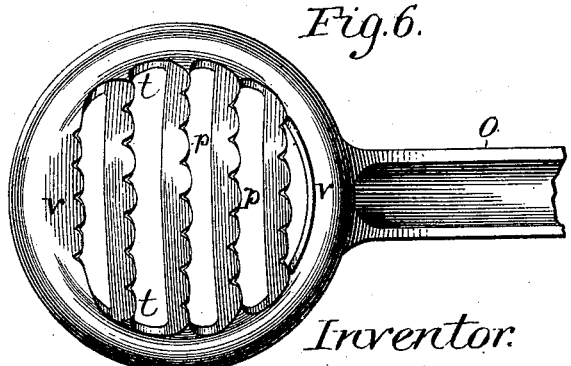
Witnesses:
John G. Moon
L. H. Isherwood
Inventor:
Richard M. Pancoast
by J. E. Stebbins
Atty

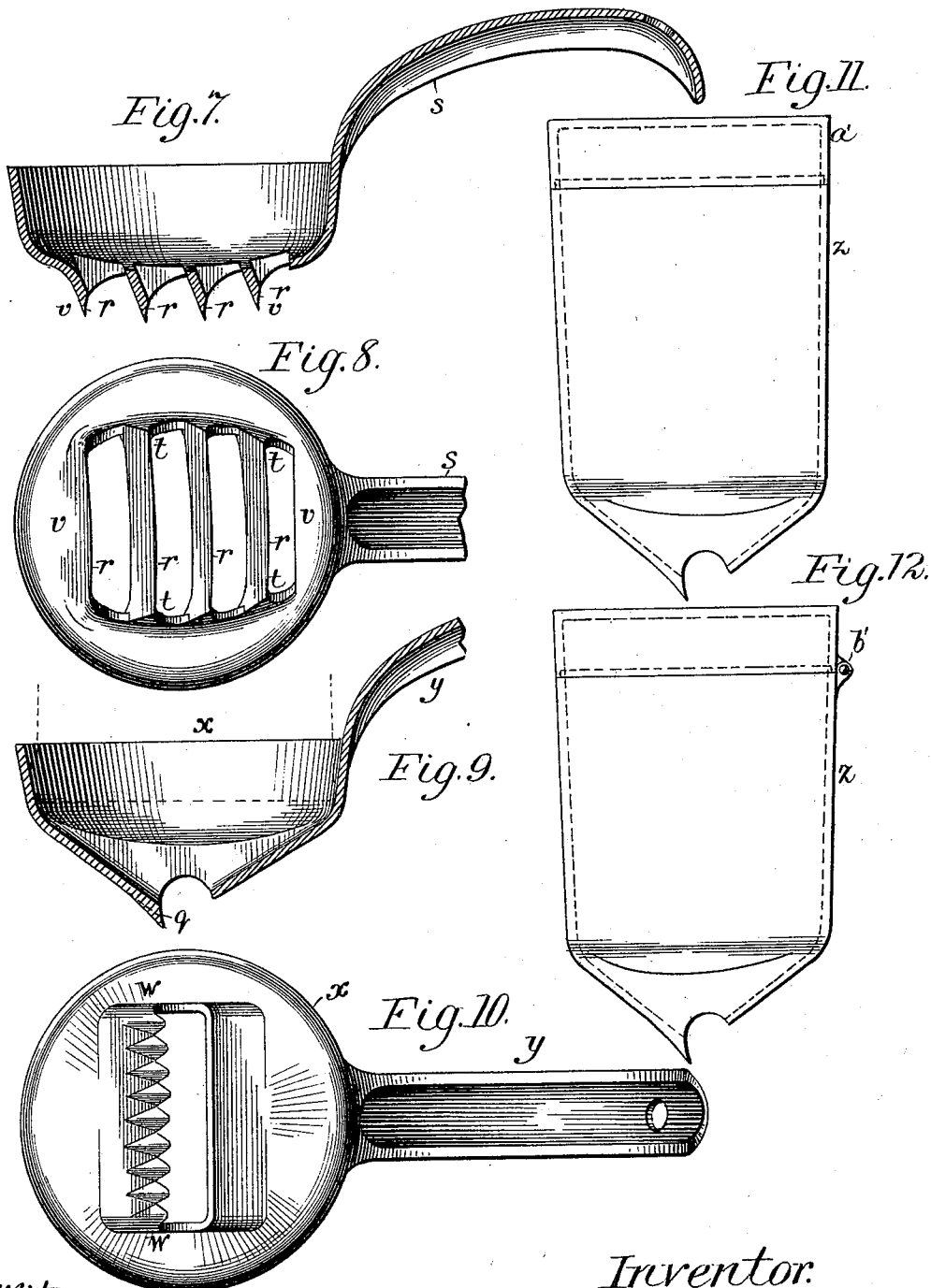

UNITED STATES PATENT OFFICE.

RICHARD M. PANCOAST, OF CAMDEN, NEW JERSEY.

ICE SCRAPER OR SHAVER.

SPECIFICATION forming part of Letters Patent No. 587,230, dated July 27, 1897.

Application filed August 12, 1896. Serial No. 602,521. (No model.)

*To all whom it may concern:*

Be it known that I, RICHARD M. PANCOAST, a citizen of the United States, and a resident of Camden, county of Camden, and State of New Jersey, have invented certain new and useful Improvements in Ice Scrapers or Shavers, of which the following, taken in connection with the accompanying drawings, is a specification sufficiently full, clear, and accurate to enable those skilled in the art to make and use the same.

Heretofore hand-operated ice scrapers or shavers have been made with an opening through the bottom in which was located an adjustable or detachable blade. This style of shaver has been found objectionable for several reasons, among them the excessive first cost, the difficulty of keeping the blade tight and properly adjusted, the shaver being used very often by comparatively ignorant and unskilled persons, the necessity of removing the blade for sharpening when it became dull, and the liability of the blade to rust on account of water adhering to the face thereof, which is loosely held in contact with the body of the implement by a set-screw or other fastening means. For these and other reasons ice-scrapers have not come into very general use. Now I think that I have conceived how an ice-scraper may be made which will not only be free from the objections above enumerated and others, but will also possess many additional features and characteristics which are desirable and of value.

*Imprimis* the objects of my invention in the main are the production of an ice scraper or shaver which will be cheap in first cost, simple in construction, not liable to become inoperative by reason of the misadjustment or derangement of a part, which can easily be sharpened, which will cut or shave an irregular-shaped block of ice however held, and which is adapted to discharge the cracked or shaved ice into a vessel during the operation of cutting or shaving.

With these objects in view my invention consists in forming an ice scraper or shaver preferably by casting and making the cutter or cutters and body thereof integral.

It further consists in making a slot or opening or several slots or openings through the bottom and a jaw or jaws integral therewith and adjacent to the opening or openings, said jaw or jaws being serrated or brought to an edge to form a blade or blades.

It further consists in forming the teeth or blade or blades so that each can repeatedly and easily be sharpened.

It further consists in forming one edge of the slot or opening through the bottom in a line above the parallel line of the cutting edge to facilitate the delivery of the shaved ice into the receptacle provided therefor.

It further consists in forming the bottom of the scraper curved on the outside, either in one or two directions or tapering or wedge-shaped, so it will project to adapt it for engaging blocks of ice of irregular contour.

It further consists in forming the scraper so that it may support a tumbler or other vessel for directly receiving the cracked or shaved ice.

It still further consists in providing a scraper so constructed with means adapted to be grasped by the hand or hands for operating the same.

Finally, it consists in certain further novelties of construction and combination of parts hereinafter described and claimed.

The accompanying drawings illustrate several examples of scrapers or shavers embodying my invention, Figures 9 and 10 showing, perhaps, the simplest form and best mode of construction I have so far devised of applying the principle.

Fig. 1 represents in section a scraper with a flange three or four inches high and a glass vessel in position for receiving the cracked or shaved ice. Fig. 2 is a plan view of the bottom of the scraper shown in Fig. 1. Figs. 3 and 4 are respectively sectional and plan views of an example having a plurality of cutters or blades. Figs. 5 and 6 are sectional and bottom plan views of still another form, showing a plurality of cutters and a handle for operating the scraper. Figs. 7 and 8 show a form provided with a series of blades. Figs. 9 and 10 illustrate a simple and desirable form of the implement provided with a single row of teeth, a handle, and a flange or rim adapted to support vessels or glasses of different diameters. Figs. 11 and 12 are views in elevation of scrapers provided with covers. Fig. 13 is a sectional view of an example in which the glass fits over instead of within the flange or rim of the scraper.

The several parts of each species or variety of construction illustrated are specifically described as follows:

In Figs. 1 and 2, $a$ is the body of the scraper, having a flange $b$ three or four inches high, within which fits a glass $c$ to receive the detached particles of ice. The diameter of the flange $b$ is greatest at the top, and it diminishes to a point $d$, thus providing for the use therein of vessels of different diameters. The flange also serves as a handhold or handle to be grasped during the operation of scraping by one or both hands, as may be found convenient. Through the bottom B of the scraper is an opening or slot $e$, preferably of the form shown. It will be observed that the longitudinal edge $f$ of the slot or opening $e$ is practically straight and smooth and in a different parallel horizontal plane from the edge $g$, and that the latter is provided with a series of teeth $h$, constituting a jaw or a cutter. These teeth are preferably of the form shown, being cast with slightly oval backs and with an extra mass of thickness of metal along the edge at the point $j$. As thus made the teeth can be repeatedly and easily sharpened by the application of a file or emery-wheel to the inner face or edge $k$ and the proper shape of the teeth for cutting into the ice preserved. Should the file or emery-wheel be applied to the back of the teeth, the angle thereof relative to the body of the scraper would be changed and its efficiency destroyed, for the teeth instead of penetrating the ice would slide over it without cutting. It is still further to be noted that the bottom of the scraper, from the point $d$ to the edge of the slot or opening, is made tapering or wedge-shaped or convex on the outer surface, so that the projecting teeth may engage the ice at whatever angle the scraper may be held and whatever the shape of the block. In practice the side of a piece of ice is soon made concave by the operation of the scraper, and should the bottom thereof be flat the edges striking the ice before the teeth would prevent the latter from engaging.

The example shown in Figs. 3 and 4 differs from that one already described in having a plurality of openings $l$ through the bottom and the projecting edges or cutters alternately provided with teeth $m$ and a plain edge or blade $n$. The flange or rim is also of less height, but tapers downwardly, as shown, to admit the insertion of glasses of different diameters. The teeth and blades are adapted to be sharpened by the application of a file or emery-wheel to the inner faces, as heretofore described.

In Figs. 5 and 6 a handle $o$ is added and all the cutters provided with teeth $p$, those on one cutter being staggered or out of line relative to those directly in front and at the rear, so that the series of ridges made in the ice by one series of teeth will be engaged by the series next in the rear.

In Figs. 7 and 8 the openings through the bottom are provided with a series of blades $r$, each having an unbroken edge. A handle $s$ like that in Fig. 5 is also shown.

In the three examples last described having a plurality of cutters the bottom part of the scraper is made less tapering in a downward direction than the example shown in Figs. 1 and 2, inasmuch as having cutters spread over almost the entire area of the bottom part some one of them will engage the ice however the scraper is held. The bottom should, however, in a slight degree, at least, be tapering or curved crosswise or lengthwise, or both; but in lieu thereof, or in addition thereto, the cutters themselves may be curved each from end to end, as from $t$ to $t$, and preferably as a series from front to rear, as from $v$ to $v$. In other words, the extreme points of all the teeth or edges of the blades should lie in an imaginary double-convex surface. Thus formed a cutter or cutters will engage the ice however held and whatever the shape of the block of ice.

In Figs. 9 and 10 the bottom part is integral with the body thereof and substantially like the form shown in Figs. 1 and 2, except that the row of teeth is slightly curved from $w$ to $w$. The flange $x$ tapers downwardly, adapting the scraper to receive vessels of different diameters, and a curved handle $y$ is provided integral with or attached to the flange. The section at $q$ is through the body of one of the teeth.

Figs. 11 and 12 show a form in which the vessel $z$ to receive the cracked or shaved ice is integral with the body of the scraper and the opening to the same at the top closed by a detachable cover $a'$ or a hinged cover $b'$. The extended flange or rim forming the body of the vessel or receptacle also serves as a handle adapted to be grasped by the operator in the act of scraping. The bottom part of each of these examples is like that shown in Figs. 1 and 2 and the same description applies.

Fig. 13 illustrates a slight modification of the preferred form shown in Figs. 9 and 10. In this case the glass or tumbler $c'$ to receive the disintegrated particles of ice fits over the flange $d'$ and not within it. A second flange $e'$ is shown outside the edge of the glass $c'$, and, if desired, the interval between the two flanges may be increased to accommodate vessels of a greater range of diameter.

From the foregoing description of the several specific examples it will be seen that I have produced a scraper or shaver having the cutter or cutters integral with the body or bottom thereof; which has a tapering or curved bottom adapting the same to blocks of ice of irregular contours; which is provided with teeth or blades so constructed that they may be easily and repeatedly sharpened and still preserve the original form suitable for the most efficient service; which has a suitable opening in the bottom for allowing the detached particles of ice to pass without interfering with the operation of the cutter or cutters; which is especially adapted to support a glass or other vessel for directly receiving the disintegrated particles of ice, and which possesses many other and desirable features and characteristics.

While I have shown in the pictured examples several species of my invention, I do not regard such examples as exhaustive of it, inasmuch as many changes and colorable variations may be introduced and equivalents adopted or selected without constituting a substantial departure. For instance, while I have stated that I prefer to make the scraper by casting the body and bottom, inclusive of the cutters, integral I may make the same of sheet-steel and press the several parts into the desired shapes between dies. Again, I may form the single integral projecting cutter (illustrated in Figs. 1, 2, 9, 10, and 13) without the teeth and in the shape of a single blade or with teeth of a different configuration and differently pointed. The bottom of the scraper may also be given a different form, such as an irregular curve, or curved either in one or two directions or made angular, and still embody my invention, especially when the integral teeth projecting from the surface thereof are adapted to engage irregular blocks of ice. Still further, while I have illustrated only two forms of the scraper adapted to support a detachable vessel or glass for directly receiving the detached particles of ice—one in which the vessel fits within a flange and the other in which the vessel fits over a flange—other forms may be selected for performing the same function at the discretion of the manufacturer. Another form of hand-grab or handle may also be substituted for any of those shown. All such and other colorable changes I shall regard as clearly falling within the scope of my claims.

What I claim is—

1. An ice-scraper having an upwardly-extending flange adapted to support a receptacle to receive the disintegrated ice; a bottom tapering inwardly and having a slot at its lower portion; and a cutter extending downwardly from such bottom at one edge of such slot; in substance as set forth.

2. An ice-scraper having an upwardly-extending flange adapted to support a receptacle; a bottom tapering inwardly and having a slot at its lower portion; and a cutter extending downwardly from the bottom at one edge of the slot, said cutter being provided with a series of teeth, in substance as set forth.

3. An ice-scraper having an upwardly-extending flange adapted to support a receptacle; a bottom tapering inwardly and having a slot at its lower portion; and a cutter extending downwardly from the bottom at one edge of the slot, said cutter being provided with a series of teeth having oval backs and with an extra mass of metal along the edge, in substance as set forth.

4. An ice-scraper having an upwardly-extending flange adapted to support a receptacle; a bottom tapering inwardly and having a slot at its lower portion; and a cutter extending downwardly from the bottom at one edge of the slot; said flange, bottom, and cutter being cast integrally, substantially as described.

5. An ice-scraper having an upwardly-extending flange adapted to support a receptacle; a bottom tapering inwardly and having a slot at its lower portion; a cutter extending downwardly from the bottom at one edge of the slot; and means to be grasped by the hand for operating the scraper, in substance as set forth.

6. An ice-scraper having an upwardly-extending flange $d'$ adapted to support a receptacle; a bottom tapering inwardly and having a slot at its lower portion; a cutter extending downwardly from the bottom at one edge of the slot; and a receptacle $c'$ for receiving the disintegrated ice, in substance as set forth.

RICHARD M. PANCOAST.

Witnesses:
JOHN WOOD, Jr.,
JOSEPH W. HENVIS.